March 21, 1961  J. L. LANSCH  2,976,343
END-CLOSURE FOR CABLE-ENCLOSING PIPES
Filed Nov. 20, 1959
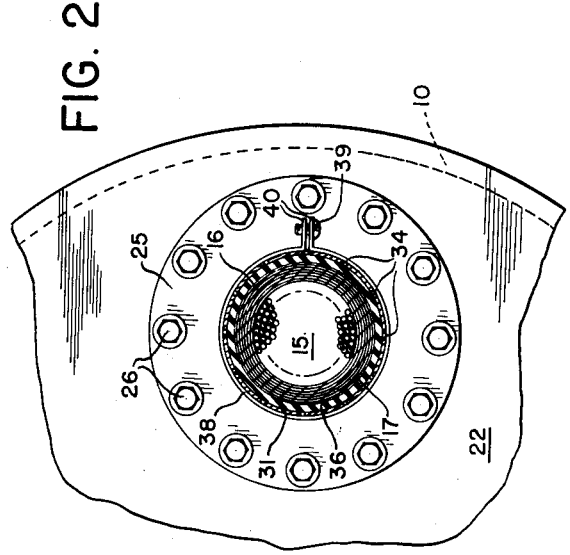
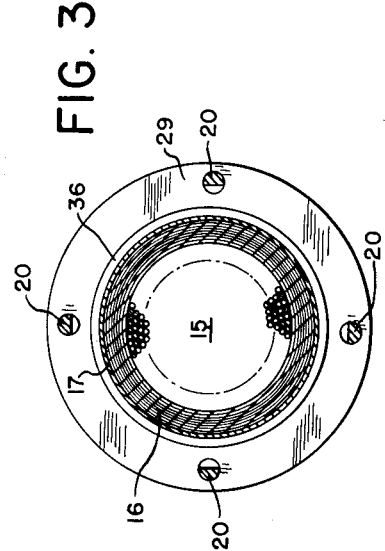
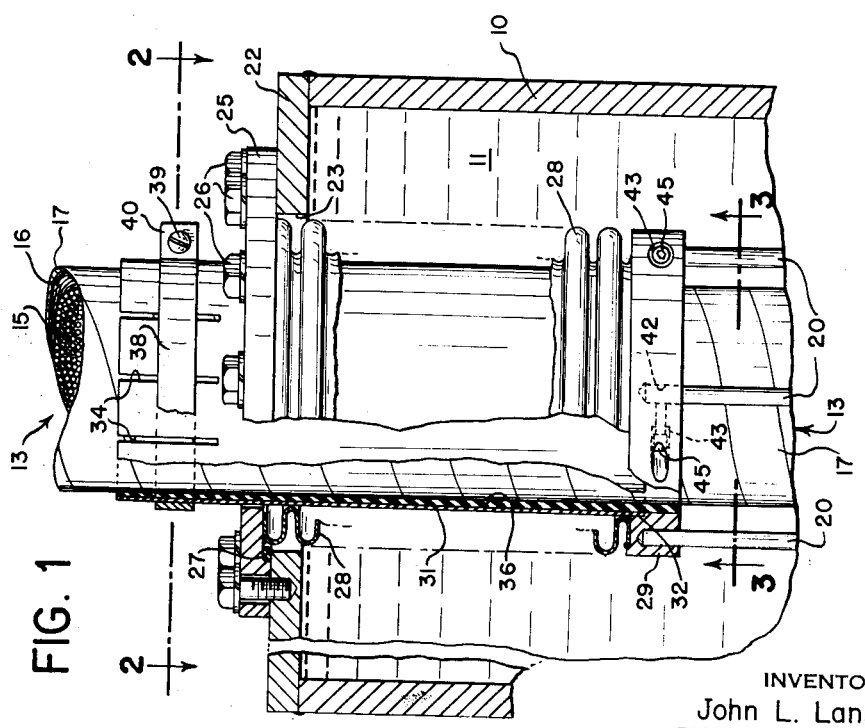
INVENTOR
John L. Lansch
BY
ATTORNEYS United States Patent Office 2,976,343
Patented Mar. 21, 1961

2,976,343
END-CLOSURE FOR CABLE-ENCLOSING PIPES

John L. Lansch, Fort Lee, N.J., assignor to Anaconda Wire and Cable Company, a corporation of Delaware Filed Nov. 20, 1959, Ser. No. 854,285

5 Claims. (Cl. 174—18)

This invention relates to closure means for sealing off the ends of pipes which enclose electric power cables immersed in a pressurized dielectric fluid. More particularly, the invention provides novel apparatus for sealing off the end of such a cable-enclosing pipe around the cable or cables extending therethrough, while permitting limited relative longitudinal movement between the cable and the end of the pipe.

Electric power cables are often insulated by impregnating layers of porous insulation around the conductor of the cable with a fluid dielectric, such as oil or an inert gas. For very high voltage uses, power cables of this type are enclosed in steel pipes which contain the fluid dielectric around the cable under high pressure, so that no voids may develop in porous insulation which might lead to electrical breakdown. Along with such cable-enclosing pipes, however, special apparatus must be employed to terminate and seal off the end of the pipe so that the cable therein can extend through the fluid seal to be joined to another cable, a pothead, or other connection. The problem is further complicated by the relative longitudinal movement which tends to occur between the cable and the end of the pipe as the cable expands and contracts during fluctuations in the power load on the cable.

It is the broad purpose of this invention to provide an effective closure for the ends of such cable-enclosing pipes which permits the cables to move to a limited extent relative to the end of the pipe and which prevents leakage of the pressurized fluid dielectric. The closure means of the invention comprises a collar adapted to encircle the cable and to be affixed to the end of the pipe in sealing engagement therewith. An axially resilient tubular bellows member is attached and sealed to the inner peripheral portion of the collar and is adapted to extend into the pipe. Attached and sealed about the end of the bellows member remote from the collar is an annular cuff member. A sleeve is attached and sealed at one end about the cuff member and extends freely through the bellows member beyond the collar. An extended resilient inner tubular liner is disposed in continuous engagement about the inside surface of the sleeve and is adapted to fit about the cable in continuous engagement therewith. Releasable circumferential gripping means are included for compressing and sealing the end portion of the sleeve and liner remote from the cuff member against the cable.

The invention contemplates the combination of new closure means with a cable-enclosing pipe through which at least one insulated electric power cable extends and in which a pressurized dielectric fluid is contained. In one embodiment of this combination, at least one skid wire extends along the cable throughout substantially its entire length, and clamping means are provided on the cuff member to secure the end of this skid wire.

The end-closure of the invention is particularly easy to assemble in the field, so that no leakage of the pressurized fluid dielectric will occur. Each of the various junctions between the elements of the apparatus is sealed either by a continuous weldment or by a resilient sealing element specially designed to prevent leakage. When applied as described, the closure member permits the cable to move relative to the end of the pipe without allowing leakage of the pressurized fluid. Thus, as the cable expands or contracts in length during fluctuations in the power load, the cable, liner, sleeve and cuff member all move together with one end of the bellows member while the opposite end of the bellows member is held stationary on the collar.

These and other advantages of the new closure means will be made clear from the following description of a preferred embodiment of the invention which is illustrated by the accompanying drawing, wherein:

Fig. 1 is an elevation partly broken away and in section of the closure means of the invention in combination with a cable-enclosing pipe containing an electric power cable immersed in a pressurized dielectric fluid;

Fig. 2 is a fragmentary section taken along the line 2—2 of Fig. 1; and

Fig. 3 is a section taken along the line 3—3 of Fig. 1.

Referring first to Fig. 1, the end of a cylindrical cable-enclosing pipe 10 is shown. A dielectric oil 11 is contained within the pipe which may be at a pressure, for example, of about 200 p.s.i. A cable 13 which extends through the pipe and beyond the end thereof is immersed in the oil 11.

As seen most clearly in Figs. 1 and 2, the cable 13 may be of the type which includes a stranded copper conductor 15 and a wrapping of oil-permeable insulation 16. It is frequently advantageous to apply to the cable 13 several skid wires 20 which extend along the outside of the cable, e.g., by being helically wrapped thereon, throughout substantially its entire length to protect the tape 17 and the paper insulation 16 from damage when the cable is pulled through the pipe 10 during installation. Preferably, the skid wires 20 are of D-shaped cross section, as shown in Fig. 3, so that they have a flat surface adapted to lie in face-to-face contact with the outer surface of the insulation 16.

The new closure means includes a circular end plate 22 which extends transversely across and is welded continuously to the end of the pipe 10. Formed in the end plate 22 is a circular aperture 23 (one such aperture being provided for each cable 13 in the pipe 10, if the pipe contains more than one cable). The aperture 23 is considerably larger in diameter than the cable 13 so that the cable freely passes through the end plate 22.

On the outer face of the end plate 22 is a collar 25 which is held in place by a plurality of bolts 26 extending through the collar into the end plate. The collar 25 is arranged concentrically about the aperture 23 and extends radially inwardly over the peripheral portion of the aperture toward the cable 13. However, the inside diameter of the collar 25 is also considerably greater than the diameter of the cable so that there is an annular gap between the collar and cable. To insure that the oil 11 does not leak through the junction between the collar 25 and the end plate 22, an O-ring gasket 27 is gripped tightly between the collar and end plate inside the circle of bolts 26.

Welded continuously to the inner peripheral portion of the collar 25 is a bellows member 28 which extends inwardly through the aperture 23 into the pipe 10. The bellows member 28 is of substantially cylindrical construction transversely corrugated so that it is axially resilient. Welded continuously about the free end of bellows member 28 remote from the collar 25 is an annular cuff member 29 which is adapted to move with the free end of the bellows member. The innermost diameter of the bellows member 28 and cuff member 29 is substantially greater than the diameter of the cable 13 and the outermost diameter of the bellows member 28 and cuff member 29 is less than the diameter of the circular aperture 23 in the end plate 22.

A thin-walled cylindrical sleeve 31 is welded continuously at one end to the inside of the cuff member 29 in a small annular recess 32 formed about the inner periphery of the cuff member. The sleeve 31 is of substantially the same inside diameter as the cuff member 29 and is sufficiently small in outside diameter to extend freely through the inside of the bellows member 28 and collar 25 and outwardly beyond the end of the pipe 10. A plurality of slits 34 are formed in the outer end portion of the sleeve 31 and extend longitudinally inwardly from the end of the sleeve. The slits 34 terminate short of the collar 25, however, so that they lie completely on the outside of the pipe.

A resilient tubular liner 36 is disposed in sealing engagement between the cable 13 and the inside surface of the sleeve 31 from the outer slitted end of the sleeve 31 to the inner end of the cuff member 29. Thus, the outside diameter of the liner 36 is substantially equal to the inside diameter of the sleeve 31, and the inside diameter of the liner 36 is substantially equal to the outside diameter of the cable 13. The liner 36 is advantageously of rubber, or similar elastomeric material, which is chemically resistant to the oil 11 and which is sufficiently resilient to deform readily under the fluid pressure within the pipe.

Circumferential gripping means in the form of a hose clamp 38 encircles the end portion of the sleeve 31 over the slits 34. The hose clamp 38 can be tightened about the sleeve by a clamp screw 39 extending through closely spaced tabs 40. By tightening the hose clamp 38 about the slitted portion of the sleeve 31, the end portion of the liner 36 remote from the cuff member 29 can be compressed tightly against the outside surface of the cable 13. If desired, tape may be wrapped about the slitted end of the sleeve 31 and up over the projecting end of the cable to further secure the sleeve to the cable.

It will be noted that the skid wires 20 terminate within the pipe 10. Consequently, clamping means are provided on the cuff member 29 to secure the ends of each of the skid wires. As shown in Fig. 1, each of these clamping means includes a drilled hole 42, of sufficient diameter to receive the end of one of the skid wires 20, formed in the inner face of the cuff member 29 parallel to its axis. A countersunk bore 43 is also formed in the peripheral surface of the cuff member 29 intersecting the hole 42 at right angles. The inner portion of the countersunk bore 43 is internally threaded to receive a set screw 45 which can anchor the skid wire 20 securely in place in the hole 42.

The closure means of the invention may be assembled in the field as follows: After the cable 13 has been pulled through the pipe 10, the end of the cable is left extending a short distance beyond the end of the pipe and the skid wires 20 are cut off just inside the pipe. The resilient liner 36 is then fitted about the outside of the cable substantially in the position shown in Fig. 1. Next, the O-ring gasket 27 and a pre-assembly of the collar 25, bellows member 28, cuff member 29, and sleeve 31 are brought up behind the end plate 22, and the bellows 28 and cuff member 29 are directed through the aperture 23 around the liner 36. The collar 25 is then fastened to the end plate 22 by means of the bolts 26 with the O-ring gasket 27 positioned therebetween as shown. The ends of the skid wires 20 are pulled out of the pipe and secured in the holes 42 by the screws 45. Since the skid wires 20 are usually helically wrapped about the cable sufficient slack can be secured by unwinding them to permit them to be pulled out in this manner, and when clamped to the cuff 29, they may be wrapped tight again by rotating the end closure about the cable. The position of the liner 36 may now be adjusted as required so that it will be coextensive with the sleeve 31.

Sealing tape, if used, is then applied about the exposed end of the sleeve; after which the hose clamp 38 is placed around the slitted end portion of the sleeve 31 and is tightened by means of the screw 39 so that that end of the liner 36 is compressed against the cable 13.

The oil 11 may then be introduced into the interior of the pipe 10 at the desired pressure. It is prevented from leaking between the end plate 22 in the pipe 10 by the weldment securing the end plate to the pipe. Also, it is prevented from leaking between the collar 25 and the end plate 22 by the gasket 27. The only other possible avenue of escape available to the oil is through the extended area of contact between the inside surface of the liner 36 and the outside surface of the cable 13. However, after seeping along the entire length of the liner 36, the oil is easily contained by the tight clamped engagement of the sleeve and liner against cable effected by the hose clamp 38.

In operation, any thermal expansion or contraction of the cable 13 which causes it to move axially relative to the pipe is accommodated by the resilience of the bellows member 28. Thus, the cable member 13 can move relative to the end of the pipe 10 without in any way effecting the seal provided by the closure assembly.

I claim:

1. For use with a cable-enclosing pipe having at least one electric power cable extending therethrough and containing a pressurized dielectric fluid, closure means for sealing off the end of said pipe around said cable comprising a collar adapted to encircle said cable and to be affixed to the end of said pipe in sealing engagement therewith, an axially resilient tubular bellows member attached and sealed to the inner peripheral portion of said collar and adapted to extend into said pipe, an annular cuff member attached and sealed at one end about the inner end of said bellows member remote from said collar, a sleeve attached and sealed at one end about said cuff member and extending freely through said bellows member beyond said collar, an extended resilient inner tubular liner disposed in continuous engagement about the inside surface of said sleeve and adapted to fit about said cable in continuous engagement therewith, and releasable circumferential gripping means for compressing and sealing against said cable the end portion of said sleeve and liner remote from said cuff member.

2. In combination with a cable-enclosing pipe, at least one electric power cable extending through said pipe, and a pressurized dielectric fluid contained in said pipe, closure means for sealing off the end of said pipe around said cable comprising a collar encircling said cable and affixed to the end of said pipe in sealing engagement therewith, an axially resilient tubular bellows member attached and sealed to the inner peripheral portion of said collar and extending into said pipe, an annular cuff member attached and sealed about the end of said bellows member remote from said collar, a sleeve attached and sealed at one end about said cuff member and extending outwardly about said cable freely through said bellows member beyond said collar, an extended resilient inner tubular liner disposed in continuous engagement between said cable and the inside surface of said sleeve, and releasable circumferential gripping means compressing and sealing against said cable the end portion of said sleeve and liner remote from said cuff member.

3. In combination with a cable-enclosing pipe, at least one electric power cable extending through said pipe, and a pressurized dielectric fluid contained in said pipe, closure means for sealing off the end of said pipe around said cable comprising an end plate extending across and sealed to the end of said pipe, said end plate having an aperture formed therein freely accommodating said cable, an annular collar encircling said cable affixed to the outer face of said end plate around and partially over said aperture, an annular gasket sealing the junction between said end plate and said collar, an axially resilient tubular bellows member attached and sealed to the inner peripheral portion of said collar and extending into said pipe, an annular cuff member attached and sealed to the end of said bellows member remote from said collar, a sleeve attached and sealed at one end about said cuff member and extending outwardly about said cable freely through said bellows member and beyond said collar, an extended resilient inner tubular liner disposed in continuous engagement between said cable and the inside surface of said sleeve, and releasable circumferential gripping means compressing and sealing the end portion of said sleeve and liner remote from said cuff member against said cable.

4. In combination with a cable-enclosing pipe, at least one insulated electric power cable extending through said pipe, at least one skid wire adjoining the outside of said cable throughout substantially its entire length, and a pressurized dielectric fluid contained in said pipe, closure means for sealing off the end of said pipe around said cable comprising an end plate extending across and sealed to the end of said pipe, said end plate having a circular aperture formed therein freely accommodating said cable, an annular collar encircling said cable affixed to the outer face of said end plate around and partially over said aperture, an annular gasket sealing the junction between the end plate and the collar, an axially resilient tubular bellows member attached and sealed to the inner peripheral portion of said collar and extending into said pipe, an annular cuff member attached and sealed to the end of said bellows member remote from said collar, clamping means on said cuff member securing the end of said skid wire, a sleeve attached and sealed at one end about said cuff member and extending outwardly about said cable freely through said bellows member and beyond said collar, an extended resilient inner tubular liner disposed in continuous engagement between said cable and the inside surface of said sleeve, and releasable circumferential gripping means compressing and sealing the end portion of said sleeve and liner remote from said cuff member against said cable.

5. In combination with a cable-enclosing pipe, at least one insulated electric power cable extending through said pipe, a plurality of skid wires adjoining the outside of said cable throughout substantially its entire length, and a pressurized dielectric fluid contained in said pipe, closure means for sealing off the end of said pipe around said cable comprising an end plate welded across and sealed to the end of said pipe, said end plate having a circular aperture formed therein freely accommodating said cable, an annular collar encircling said cable and fastened to the outer face of said end plate around and partially over said apereture, gasket sealing the junction between said end plate and said collar, an axially resilient substantially cylindrical bellows member welded and sealed to the inner peripheral portion of said collar and extending into said pipe, an annular cuff member welded and sealed about the end of said bellows member remote from said collar, clamping means on said cuff member securing each of said skid wires, a sleeve welded and sealed at one end to said cuff and extending outwardly about said cable freely through said bellows member and beyond said collar, said sleeve having a plurality of slits formed therein extending longitudinally inwardly from the end of the sleeve remote from said cuff member and terminating short of said collar, an extended resilient inner tubular liner disposed in continuous engagement between said cable and the inside surface of said sleeve from said cuff member to the slitted end of said sleeve, and circumferential gripping means compressing and sealing the slitted portion of said sleeve against said cable.

References Cited in the file of this patent
UNITED STATES PATENTS

| 1,869,475 | Hale | Aug. 2, 1932 |
| 2,727,938 | Nicholas | Dec. 20, 1955 |

FOREIGN PATENTS

| 578,902 | Great Britain | July 16, 1946 |
| 1,054,137 | Germany | Apr. 2, 1959 |